(12) United States Patent
Yeung (10) Patent No.: US 8,971,820 B2
(45) Date of Patent: Mar. 3, 2015

(54) POWER CONSUMPTION REDUCTION IN A USER TERMINAL

(75) Inventor: Peter Yeung, Kista (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 198 days.

(21) Appl. No.: 13/808,250

(22) PCT Filed: Jul. 5, 2010

(86) PCT No.: PCT/SE2010/050776
§ 371 (c)(1),
(2), (4) Date: Jan. 3, 2013

(87) PCT Pub. No.: WO2012/005636
PCT Pub. Date: Jan. 12, 2012

(65) Prior Publication Data
US 2013/0122821 A1   May 16, 2013

(51) Int. Cl.
| | | |
|---|---|---|
| H04B 17/00 | (2006.01) | |
| H04W 52/02 | (2009.01) | |
| H04L 29/08 | (2006.01) | |
| H04L 29/06 | (2006.01) | |

(52) U.S. Cl.
CPC ........... *H04W 52/02* (2013.01); *H04L 67/2819* (2013.01); *H04L 67/2842* (2013.01); *H04L 69/18* (2013.01); *H04W 52/0258* (2013.01); *Y02B 60/50* (2013.01); *H04W 52/0232* (2013.01)
USPC ........ 455/67.11; 709/227; 709/223; 709/204; 370/258; 370/403; 370/466; 370/311

(58) Field of Classification Search
CPC ............ H04W 52/02; H04W 52/0258; H04W 52/0232; H04L 67/2819; H04L 67/2842; H04L 69/18; Y02B 60/50
USPC .......................... 455/67.11, 550.1, 556.2, 574
See application file for complete search history.

(56) References Cited

U.S. PATENT DOCUMENTS

| | | | |
|---|---|---|---|
| 6,516,316 B1 * | 2/2003 | Ramasubramani et al. ........... 1/1 |
| 7,039,037 B2 * | 5/2006 | Wang et al. .................... 370/349 |
| 7,483,690 B2 * | 1/2009 | Muramatsu et al. ........... 455/410 |

(Continued)

FOREIGN PATENT DOCUMENTS

| | | |
|---|---|---|
| EP | 2 182 328 A1 | 5/2010 |
| WO | 2808004109 A1 | 1/2008 |

(Continued)

*Primary Examiner* — Marceau Milord
(74) *Attorney, Agent, or Firm* — Rothwell, Figg, Ernst & Manbeck, P.C.

(57) ABSTRACT

A data communication emulating unit (18) in a user terminal (10) or a proxy device monitors communication between an application unit (16) in the user terminal and a proxy unit of the proxy device, which communication employs requests (REQ) and responses (RES) based on a data communication protocol. The data communication emulating unit then determines a communication pattern of the monitored communication, evaluates if the communication is efficient or not based on the communication pattern and changes communication strategy if the communication pattern is found to be inefficient. Change in strategy is performed through disrupting communication between the application unit and the proxy unit using the data communication protocol and instead ensuring that communication between the proxy unit and application unit is performed based on a signalling protocol via a signalling communication unit (20).

17 Claims, 7 Drawing Sheets

(56) References Cited

U.S. PATENT DOCUMENTS

| | | | |
|---|---|---|---|
| 7,620,404 B2 * | 11/2009 | Chesnais et al. | 455/456.1 |
| 8,112,475 B2 * | 2/2012 | Tran et al. | 709/203 |
| 8,358,975 B2 * | 1/2013 | Bahl et al. | 455/41.2 |
| 8,566,594 B2 * | 10/2013 | Soliman et al. | 713/171 |
| 8,761,064 B2 * | 6/2014 | Soliman et al. | 370/311 |
| 2008/0059582 A1 | 3/2008 | Hartikainen et al. | |
| 2011/0151922 A1 * | 6/2011 | Venteicher | 455/550.1 |

FOREIGN PATENT DOCUMENTS

| | | |
|---|---|---|
| WO | 2008115778 A1 | 9/2008 |
| WO | 2010039022 A2 | 4/2010 |

* cited by examiner

POWER CONSUMPTION REDUCTION IN A USER TERMINAL

CROSS REFERENCE TO RELATED APPLICATION(S)

This application is a 35 U.S.C. §371 National Phase Entry Application from PCT/SE2010/050776, filed Jul. 5, 2010, designating the United States, the disclosure of which is incorporated herein in its entirety by reference.

TECHNICAL FIELD

The invention relates to power reduction in user terminals. More particularly, the invention relates to a method, communication device, computer program and computer program product for reducing the power consumption of a user terminal as well as to a method, communication device, computer program and computer program product for assisting in the reduction of the power consumption of a user terminal.

BACKGROUND

Mobile applications and Web applications, for instance applications provided through so-called browsers, are becoming more and more interesting to use in various types of user terminals, like cellular phones, lap tops, palm tops, electronic organizers etc.

These browsers typically employ a data communication protocol, like hyper text transfer protocol (http) that uses requests and responses to such requests in order to publish or subscribe to content.

However, the efficiency of the transfer of usable data is often not too high. Often there is a connection up and running between a user terminal and a server despite the amount of new and relevant data transferred being low or even at times non-existing.

Some of the communication could also involve repeatedly transferring the same data.

This is of no major concern if the user terminal has a virtually unlimited energy supply, such as if it is being connected to an electric mains power supply.

However, many of the user terminals are today mobile or movable and then by necessity battery powered. The use of radio circuits for transmission of redundant data or even only to keep a connection open will therefore drain the user terminal on power and thus shorten the usable period of the user terminal. There is thus a waste of energy.

Many user terminals do also employ cellular communication. The cellular communication channels are also a limited resource. This also means that unnecessary bandwidth is occupied without relevant data being transferred, which also reduces the efficiency of the communication network via which the user terminal communicates. This thus also leads to a lowering of the capacity and a waste of energy in the communication network.

There is therefore a need for improving energy consumption in relation to applications in user terminals that employ request and responses based on a computer communication protocol, like http.

SUMMARY

The invention is therefore directed towards reducing the energy consumption in user terminals having application units communicating using a data communication protocol.

One object of the invention is thus to ensure a reduction of the power consumption of a user terminal having an application unit using a data communication protocol.

This object is according to a first aspect of the invention achieved through a method for reducing the power consumption of a user terminal in a communication network, where the method is performed in a data communication emulating unit located in the user terminal or in a proxy device of the communication network. This method comprises the steps of:
monitoring communication between an application unit in the user terminal and a proxy unit in the proxy device, which communication employs requests and responses based on a data communication protocol,
determining a communication pattern of the monitored communication,
evaluating if the communication is efficient or not based on the communication pattern, and
changing communication strategy if the communication pattern is found to be inefficient. The changing of communication strategy here involves disrupting communication between the application unit and the proxy unit using the data communication protocol and instead ensuring that communication between the proxy unit and application unit is performed based on a signalling protocol.

This object is according to a second aspect of the invention achieved by a communication device for reducing the power consumption of a user terminal in a communication network. This communication device comprises: a data processing unit communicating with another data processing unit employing requests and responses based on a data communication protocol, where one of the data processing units is an application unit in the user terminal and the other is a proxy unit in a proxy device of the communication network, a signalling communication unit for communicating with entities in the network using a signalling protocol and a data communication emulating unit. The data communication emulating unit monitors the communication between the application unit and the proxy unit, determines a communication pattern of the monitored communication, evaluates if the communication is efficient or not based on the communication pattern and changes communication strategy if the communication pattern is found to be inefficient. The change of communication pattern then involves disrupting communication between the application unit and the proxy unit using the data communication protocol and instead ensuring that communication between the proxy unit and application unit is performed based on the signalling protocol.

This object is according to a third aspect of the invention also achieved through a computer program for reducing the power consumption of a user terminal in a communication network comprising computer program code which when run on a data communication emulating unit located in the user terminal or in a proxy device of the communication network causes the data communication emulating unit to monitor communication between an application unit in the user terminal and a proxy unit in the proxy device, where the communication employs requests and responses based on a data communication protocol, determine a communication pattern of the monitored communication, evaluate if the communication is efficient or not based on the communication pattern and change communication strategy if the communication pattern is found to be inefficient. The change of communication pattern here furthermore involves disrupting of communication between the application unit and the proxy unit using the data communication protocol and instead ensuring that communication between the proxy unit and application unit is performed based on a signalling protocol.

A fourth aspect of the invention is directed towards a computer program product comprising a computer program according to the third aspect and a computer readable means on which the computer program is stored.

The invention according to these aspects has a number of advantages. The energy consuming communication that uses the data communication protocol is disrupted and instead signalling based communication is used. In this way it is possible to only perform communication or to only open a communication link when it is necessary to actually send and receive data, which improves the efficiency considerably. The communication between the application unit and proxy unit is kept to a minimum. Through this measure network resources are also liberated. A dedicated connection is not kept, which also allows for a more flexible use of the communication network. The invention therefore also leads to a more efficient use of the communication network because of fewer data connections and also a lower energy usage in the communication network. The invention also allows the application unit to be kept unaware of the change in communication. This has the advantage that the application unit does not need any modification. The invention can therefore function in relation to any type of application in the application unit that uses the data communication protocol.

According to one variation of the invention the data communication emulating unit is provided at one end of a communication link between the user terminal and the proxy device.

According to this variation the step of changing communication strategy in the method comprises notifying the change to the corresponding data communication emulating unit at the opposite end of the communication link about the change.

According to this variation of the invention the communication emulating unit of the communication device is further configured to notify the change to the corresponding data communication emulating unit at the opposite end of the communication link.

According to the same variation of the invention, the computer program includes further computer program code causing the data communication emulating unit to notify the change to the corresponding data communication emulating unit at the opposite end of the communication link.

The notifying can also comprise a notification of the communication pattern.

In another variation of the invention, the step of monitoring in the method comprises detecting at least one request for data sent by the application unit, where the request is intended for a content providing device via the proxy unit of the proxy device, the step of determining the communication pattern comprises determining the length of time between a first request and a response and the step of evaluating if the communication is efficient or not comprises comparing the length of time with a threshold, where the communication is found to be inefficient if the threshold is exceeded.

In this variation of the invention the data communication emulating unit is further configured to detect at least one request for data sent by the application unit when performing monitoring, where the request is intended for a content providing device via the proxy unit of the proxy device, to determine the length of time between a first request and a response when determining the communication pattern, to compare the length of time with a threshold when evaluating if the communication is efficient or not and configured to find the communication to be inefficient if the threshold is exceeded.

In this same variation of the invention, the computer program includes further computer program code causing the data communication emulating unit to detect at least one request for data sent by the application unit when performing monitoring, where the request is intended for a content providing device via the proxy unit of the proxy device, to determine the length of time between a first request and a response when determining the communication pattern, to compare the length of time with a threshold when evaluating if the communication is efficient or not and to find the communication to be inefficient if the threshold is exceeded.

This latter variation can be modified in that the step of detecting at least one request comprises detecting an indication in the request that the communication link between the application unit and the proxy unit is to be kept open for several requests and responses.

This means that the data communication emulating unit can be further configured to detect an indication in the request that the communication link between the application unit and the proxy unit is to be kept open for several requests and responses when detecting at least one request.

This also means that the computer program can include further computer program code causing the data emulating unit to detect an indication in the request that the communication link between the application unit and the proxy unit is to be kept open for several requests and responses when detecting at least one request.

According to another variation of the invention, the step of monitoring in the method comprises detecting requests for data sent by the application unit as well as detecting responses to these requests sent by the proxy unit to the application unit, which requests are intended for content providing devices via the proxy unit of the proxy device and which responses originate from content providing devices via the proxy unit of the proxy device, the step of determining the communication pattern comprises investigating the requests and responses and the communication is found to be inefficient if the same response is received to requests intended for the same content providing device.

According to this same variation the data communication emulating unit is further configured to detect requests for data sent by the application unit as well as detect responses to these requests sent by the proxy unit to the application unit when performing monitoring, which requests are intended for content providing devices via the proxy unit of the proxy device and which responses originate from content providing devices via the proxy unit of the proxy device, to investigate the requests and responses when determining the communication pattern and configured to find the communication to be inefficient if the same response is received to requests intended for the same content providing device.

In this same variation of the invention, the computer program includes computer program code causing the data communication emulating unit to detect requests for data sent by the application unit as well as detect responses to these requests sent by the proxy unit to the application unit when performing monitoring, which requests are intended for content providing devices via the proxy unit of the proxy device and which responses originate from content providing devices via the proxy unit of the proxy device, to investigate the requests and responses when determining the communication pattern and configured to find the communication to be inefficient if the same response is received to requests intended for the same content providing device The data communication emulating unit may be a first data communication emulating unit in the user terminal.

When this is the case, the last variation can be modified through the method further comprising the step of copying the responses received by the application unit and when, after a change of communication strategy has been made, a new request destined to the content providing device is being sent by the application unit responding to the request with a copy of a previous response while stopping the request from being sent to the proxy device.

This means that the data communication emulating unit can be further configured to copy the responses received by the application unit and to respond to a new request destined to the content providing device being sent by the application unit after a change of communication strategy has been made with a copy of a previous response while stopping the request from being sent to the proxy device.

This also means that the computer program can include further computer program code causing the data communication emulating unit to respond to a new request destined to the content providing device being sent by the application unit after a change of communication strategy has been made with a copy of a previous response while stopping the request from being sent to the proxy device.

The data communication emulating unit can also be a second data communication emulating unit in the proxy device, in which case the method may further comprise the step of copying the request sent by the application unit and sending, after a change of communication strategy has been made, request copies to the content providing device according to the communication pattern while stopping responses from reaching the user terminal.

In this latter case the data communication emulating unit may be further configured to copy the request sent by the application unit and send, after a change of communication strategy has been made, request copies to the content providing device according to the communication pattern while stopping responses from reaching the user terminal.

In this case the computer program may also be further configured to cause the data communication emulation unit to copy the request sent by the application unit and send, after a change of communication strategy has been made, request copies to the content providing device according to the communication pattern while stopping responses from reaching the user terminal.

The data communication emulating unit may also comprise a communication pattern evaluating unit configured to perform monitoring of the communication between the application unit and the proxy unit for determining a communication pattern, evaluate if the communication is efficient or not and ordering a change of communication strategy. This data communication emulating unit may also comprise a data communication emulating element configured to perform the communication according to this strategy change through emulating a data communication connection using signalling based communication.

Another object of the invention is to assist in the reduction of the power consumption of a user terminal having an application unit using a data communication protocol.

This object is according to a fifth aspect of the invention achieved through a method for assisting in the reduction of the power consumption of a user terminal in a communication network. The method is performed in a data communication emulating unit located in the user terminal or in a proxy device of the network. The method furthermore comprises the steps of receiving a notification of a change of communication strategy from a corresponding data communication emulating unit of a corresponding communication device and changing communication strategy based on the received notification. The communication strategy concerns communication between an application unit in the user terminal and a proxy unit in the proxy device and the communication employs requests and responses based on a data communication protocol. The change in strategy is furthermore performed through disrupting data communication between the proxy unit and the application unit using the data communication protocol and ensuring that the communication between the application unit and proxy unit is performed based on a signalling protocol.

This object is according to a sixth aspect of the invention achieved through a communication device for assisting in the reduction of the power consumption of a user terminal in a communication network, where the communication device comprises a data processing unit communicating with a further data processing unit of a further communication device employing requests and responses based on a data communication protocol, where one of the data processing units is an application unit in the user terminal and the other is a proxy unit in a proxy device of the communication network, a signalling communication unit for communicating with entities in the network using a signalling protocol and a data communication emulating unit. The data communication emulating unit is configured to receive a notification of a change of communication strategy from a corresponding data communication emulating unit of the further communication device, where the communication strategy concerns the communication between the application unit and the proxy unit, and change communication strategy based on the received notification. The change in communication strategy involves disrupting data communication between the proxy unit and the application unit using the computer communication data communication protocol, and ensuring that the communication between the application unit and proxy unit is performed based on the signalling protocol.

This object is according to a seventh aspect of the invention furthermore achieved through a computer program for assisting in the reduction of the power consumption of a user terminal in a communication network, where the computer program comprises computer program code, which when run on a data communication emulating unit located in a user terminal or in a proxy device of the communication network causes the data communication emulating unit to receive a notification of a change of communication strategy from a corresponding data communication emulating unit of a corresponding communication device and change communication strategy based on the received notification. The communication strategy concerns communication between an application unit in the user terminal and a proxy unit in the proxy device, which communication employs requests and responses based on a data communication protocol. The strategy change is implemented through disrupting data communication between the proxy unit and the application unit using the data communication protocol, and ensuring that the communication between the application unit and proxy unit is performed based on a signalling protocol.

An eighth aspect of the invention is directed towards a computer program product comprising a computer program according to the seventh aspect and a computer readable means on which the computer program is stored.

According to one variation of the invention the data communication emulating unit is a first data communication emulating unit in the user terminal and the corresponding data communication emulating unit is a second data communication emulating unit in the proxy device also communicating with a content providing device using requests and responses based on a data communication protocol.

When this is the case, the variation can be modified through, after a change of communication strategy has been made, responding to requests destined to the content providing device and being sent by the application unit with a copy of a previous response while stopping the request from being sent to the proxy device.

This means that the data communication emulating unit can be further configured to, after a change of communication strategy has been made, respond to a request destined to the content providing device and being sent by the application unit with a copy of a previous response while stopping the request from being sent to the proxy device.

This also means that the computer program can include further computer program code causing the data communication emulating unit to, after a change of communication strategy has been made, respond to a request destined to the content providing device and being sent by the application unit with a copy of a previous response while stopping the request from being sent to the proxy device.

The corresponding data communication emulating unit can also be a first data communication emulating unit in the user terminal and the data communication emulating unit a second data communication emulating unit in the proxy device also communicating with a content providing device using requests and responses based on a data communication protocol.

In this latter case the method comprises, in a further variation of the invention, the further step of retaining the communication with the content providing device.

In this latter case the data communication emulating unit may be further configured to ensure that the proxy unit retains the communication with the content providing device.

In this case the computer program may also be further configured to cause the data communication emulation unit to ensure that the proxy unit retains the communication with the content providing device.

According to yet another variation of the invention, when the corresponding data communication emulating unit is a first data communication emulating unit in the user terminal and the data communication emulating unit is a second data communication emulating unit in the proxy device, the method comprises the further steps of sending, after a change of communication strategy has been made, copies of requests to the content providing device according to the communication pattern while stopping responses from reaching the user terminal.

According to this variation the data communication emulating unit may be further configured to ensure that, after a change of communication strategy has been made, copies of requests are sent to the content providing device according to the communication pattern while stopping responses from reaching the user terminal.

In this case the computer program may also be further configured to cause the data communication emulation unit to ensure that, after a change of communication strategy has been made, copies of requests are sent to the content providing device according to the communication pattern while stopping responses from reaching the user terminal.

The data communication protocol is in one variation of the invention the Hyper Text Transfer Protocol, while signalling protocol is the Session Initiation Protocol.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail.

The invention is generally directed towards reducing the power consumption in a user terminal when being equipped with an application unit, which uses a data communication protocol that is based on requests—and responses, such as a client-server protocol. The protocol is also with advantage an application layer protocol according to the OSI model. Such a protocol can be a Hyper Text Transfer Protocol (http) and other protocols based on the http family like Hyper Text Transfer Protocol Secure (https) or protocols above it such as Simple Object Access Protocol (SOAP). It should however be realized that the present invention is not limited to this specific protocol, but may be used with other protocols, such as Advanced Program to Program Communication (APPC), BitTorrent and Data Distribution Service (DDS).

An application unit performing such a function can be a thin client essentially only having data presentation capability, such as a web browser. However, it can also be a thick client that has more processing capability.

The application unit can furthermore be any type of application unit using the above mentioned data communication protocol, which use may employ one or more other protocols such as Asynchronous JavaScript (AJAX), Extensible Messaging and Presence Protocol (XMPP) using Bidirectional-streams Over Synchronous HTTP (BOSH), i.e. XMPP over BOSH, Comet, Bayeux and Pushlet.

Computer communication and telecommunication are converging more and more. This has the advantage in providing many telecommunication users with computer communication related services and functionality, but also the advantage of providing computer users with telecommunication services and functionality. This has made it possible for users to obtain content from servers on networks like the Internet using various types of terminals and networks.

However, the evolution of the communication technology used for accessing the content has more or less been computer based, where the special circumstances of for instance cellular communication has not been addressed or been insufficiently addressed.

One such special circumstance is the question of energy consumption. As many cellar devices are portable, they are normally battery powered. The battery does have a limit in the power it is able to store. This means that communication has to be efficient in order to avoid a too fast battery discharge.

Computer communication has in many respects evolved without considering this question of energy consumption. This means that the communication performed by an application unit using a data communication protocol often uses unnecessary energy or put differently the amount of power needed for obtaining content is often unnecessarily high considering the actual amount of content received.

The present invention addresses this situation.

Figure 1:
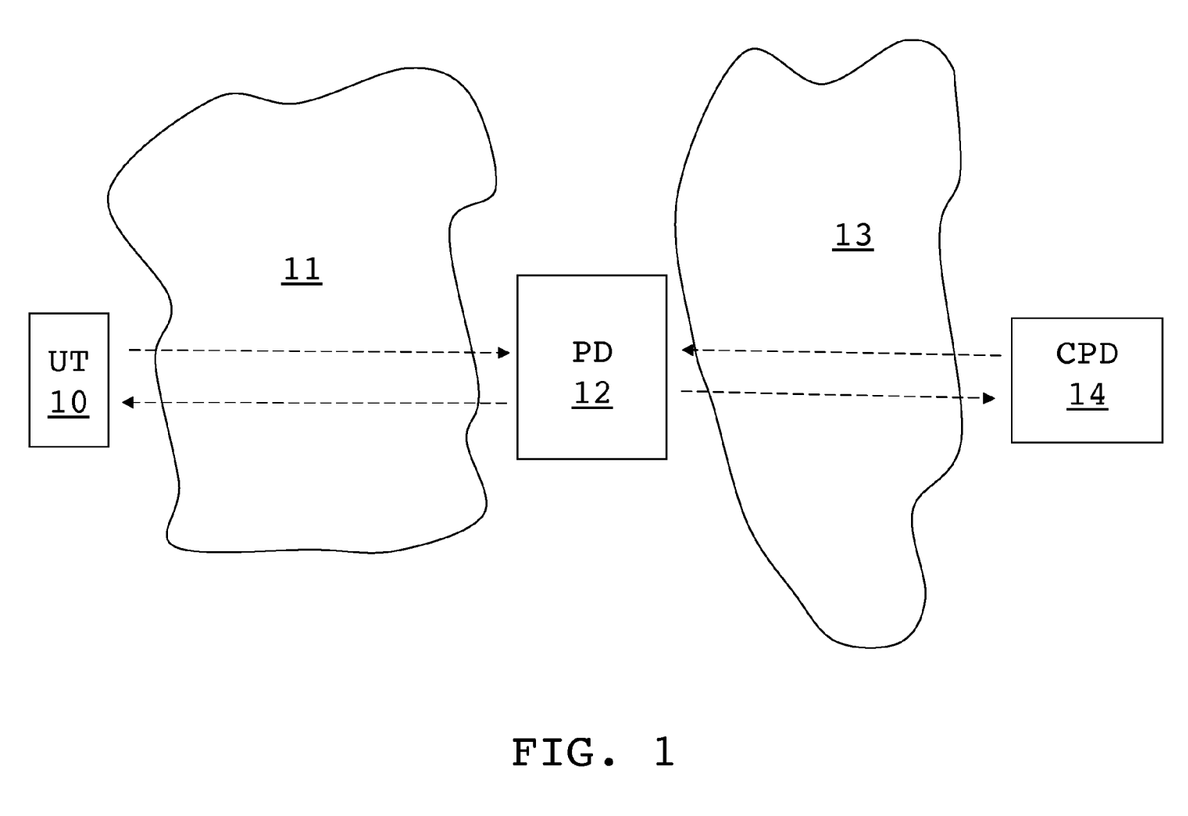
FIG. 1 schematically shows a user terminal communicating with a content providing device via a proxy device and a first and second communication network.

A first variation of the invention will now be described in more detail in the non-limiting example context of two communication networks. Two networks 11 and 13 are shown in FIG. 1. A first of the communication networks 11 may here be a cellular network such as a Universal Mobile Telecommunications System (UMTS) network or a Long Term Evolution (LTE) network and the second communication network 13 may be a computer communication network like the Internet.

To the first network 11 there is connected a user terminal 10 being associated with a user. Here the user terminal may be a phone, such as mobile phone or a computer like a lap top computer or a palm top computer. These are mere examples of user terminals that can be used together with the invention.

A proxy device 12 is associated with the first network 11, which proxy device may be a proxy server like a Wireless Application Protocol (WAP) server. This proxy device may be provided outside of the first communication network 11 and act as a kind of gateway in relation to the second network 13. However, it is in fact associated with the first network 11 and being provided for user terminals of this first network 11. This proxy device 12 is in turn connected to a content providing device 14 via the second communication network 13. A user of the user terminal 10 can here obtain content from the content providing device 14 with the help of an application unit in the user terminal and the proxy device 12. This is as such known within the art. The proxy device does in this respect limit the amount of data actually being sent to the user terminal. However in relation to WAP this limitation is concerned with the display size limitations of the user terminal and not the way that communication is performed. There is therefore still room for improvement in this regard.

Figure 2:
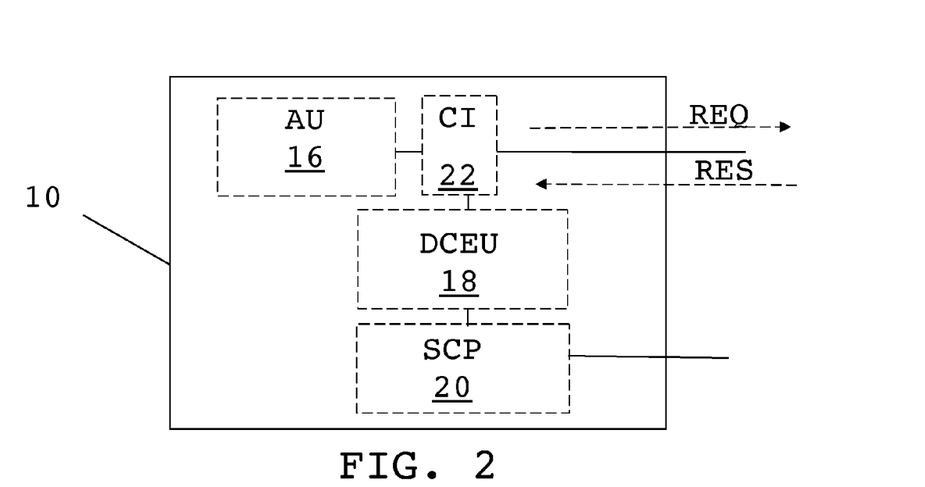
FIG. 2 shows a simplified block schematic of a user terminal that comprises an application unit, a first communication interface of this application unit, a first data communication emulating unit and a signalling communication platform.

FIG. 2 shows a block schematic of the user terminal 10 according to a first variation of the invention. The user terminal comprises an application unit AU 16, which communicates with the proxy device via a first communication interface CI 22. The application unit 16 which is a first data processing unit that may be in the form of a browser, here sends a request REQ for content and receives a response RES to this request via the communication interface 22. The request REQ for content can here be a publish or subscribe related request. The first communication interface 22 is here typically a socket set up by the application unit 16. This interface is therefore a data protocol interface associated with the data communication protocol used by the application unit. There is furthermore a first data communication emulating unit DCEU 18, which monitors the communication of the application unit 16 via the first communication interface 22. The data communication emulating unit 18 is also connected to a signalling communication unit for communicating with entities in the network using a signalling protocol. This signalling communication unit is here a signalling communication platform SCP 20. This signalling communication platform 20 is here typically an IP Multimedia Subsystem (IMS) platform employing a signalling protocol such as Session Initiation Protocol (SIP).

It should here be realized that the user terminal shown in FIG. 2 is simplified with a lot of units left out, such as a display, a keypad and radio communication technology such as antenna and radio circuits etc. These have been left out for providing a clearer understanding of the invention.

Figure 3:
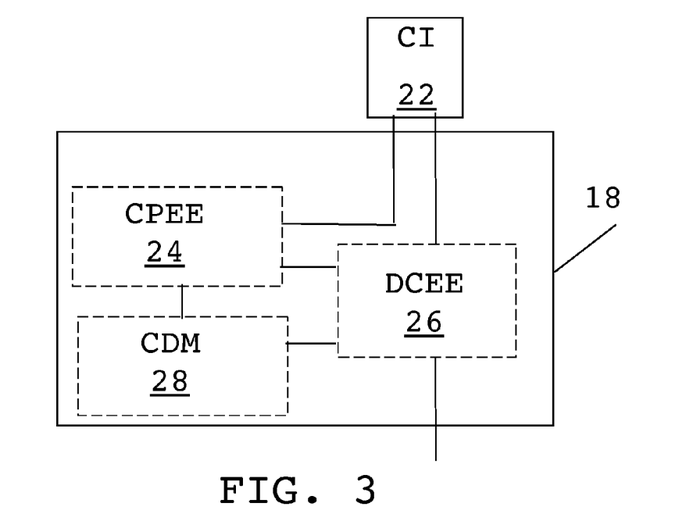
FIG. 3 shows a simplified block schematic of a first data communication emulating unit in the user terminal being connected to the communication interface used by the application unit.

FIG. 3 shows a block schematic of the first data communication emulating unit 18 together with the first communication interface 22. The first data communication emulating unit here includes a communication pattern evaluating element CPEE 24, a communication data memory CDM 28 and a data communication emulating element DCEE 26. Both the communication pattern evaluating element 24 and the data communication emulating element 26 are connected to the first communication interface 22. The data communication emulating element 26 is also connected to the communication pattern evaluating element 24 as well as to the signalling communication platform (not shown). The communication data memory 28 is also connected to the communication pattern evaluating element 24 and to the data communication emulating element 26.

Figure 4:
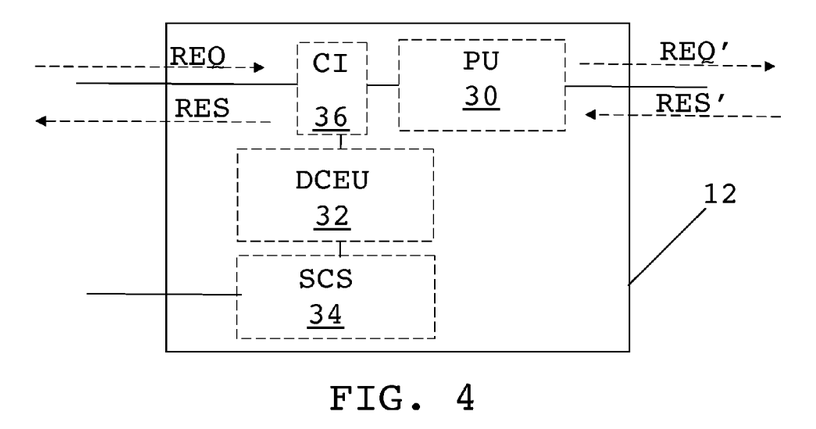
FIG. 4 shows a simplified block schematic of a proxy device comprising a proxy unit, a second communication interface of this proxy unit, a second data communication emulating unit and a signalling communication server, FIG. 5, schematically shows a request according to a data communication protocol and employed by the application unit, FIG. 6 schematically shows a response according to the data communication protocol and received by the application unit.

FIG. 4 schematically shows the structure of the proxy device corresponding to the structure of the user terminal in FIG. 2. Here there is a proxy unit PU 30 communicating with the application unit of the user terminal via a second communication interface CI 36. The proxy unit is here a second data processing unit communicating with the first data processing unit in the user terminal. The second communication interface 36 is also here a socket set up by the proxy unit 30 in the communication with the application unit of the user terminal. This interface is therefore a data protocol interface associated with the data communication protocol used by the proxy unit. The proxy unit 30 therefore receives requests REQ from the application unit and sends responses RES to these requests via the second communication interface 36. The requests REQ are in fact intended for a content providing device and therefore the proxy unit 30 sends requests REQ' corresponding to the received requests REQ to a content providing device in the second communication network 13 and in turn receives responses RES', which are forwarded as response RES to the application unit of the user terminal. Also the communication with the content providing device is performed via a communication interface in the form of a socket. However, this is not shown in FIG. 3 for reasons that will become evident later. In the proxy device there is furthermore a second data communication emulating unit 32, which is connected to the second communication interface 36 in order to monitor the data communication over this interface. The second data communication emulating unit 32 is also connected to a signalling communication unit for communicating with entities in the network using a signalling protocol, here in the form of a signalling communication server 34, which performs signalling based communication with the signalling communication platform of the user terminal.

The invention is based on monitoring of the communication between the application unit and the proxy unit. Because of this it is here necessary to also describe some general content that is provided in this communication and more particularly in the requests and responses to these requests in this communication.

In the following the user terminal is considered as having a first address A1, while the proxy device is considered as having a second address A2. As is well known these addresses may be dynamic addresses. However static addresses can also be used. These addresses may typically be Internet Protocol (IP) addresses.

Figure 5:
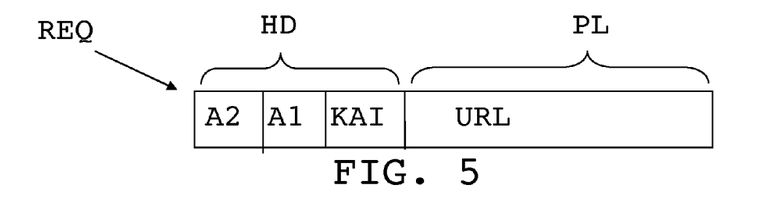
Figure 6:
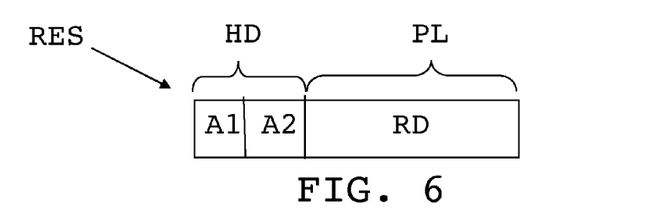

A request REQ is schematically shown in FIG. 5 and a response RES is schematically shown in FIG. 6. As is well known these messages include a header HD and a payload PL. In FIG. 5 the header HD of the request REQ includes a destination address, here the second address A2 of the proxy device, which is followed by a source address, here the first address A1 of the user terminal. These addresses are followed by a keep alive field including a keep alive indicator KAI. The payload PL includes a uniform resource locator URL identifying the content providing device. In a similar manner the header HL of the response RES includes a destination address, here the first address A1, and a source address, here the second address A2, while the payload PL includes response data RD.

It should here be realized that the request and response are only schematically shown in order to better describe the present invention. Both the payload and header may include much more data in various form of detail. However, as this data is not central to the understanding of the present invention, it has been omitted.

Figure 7:
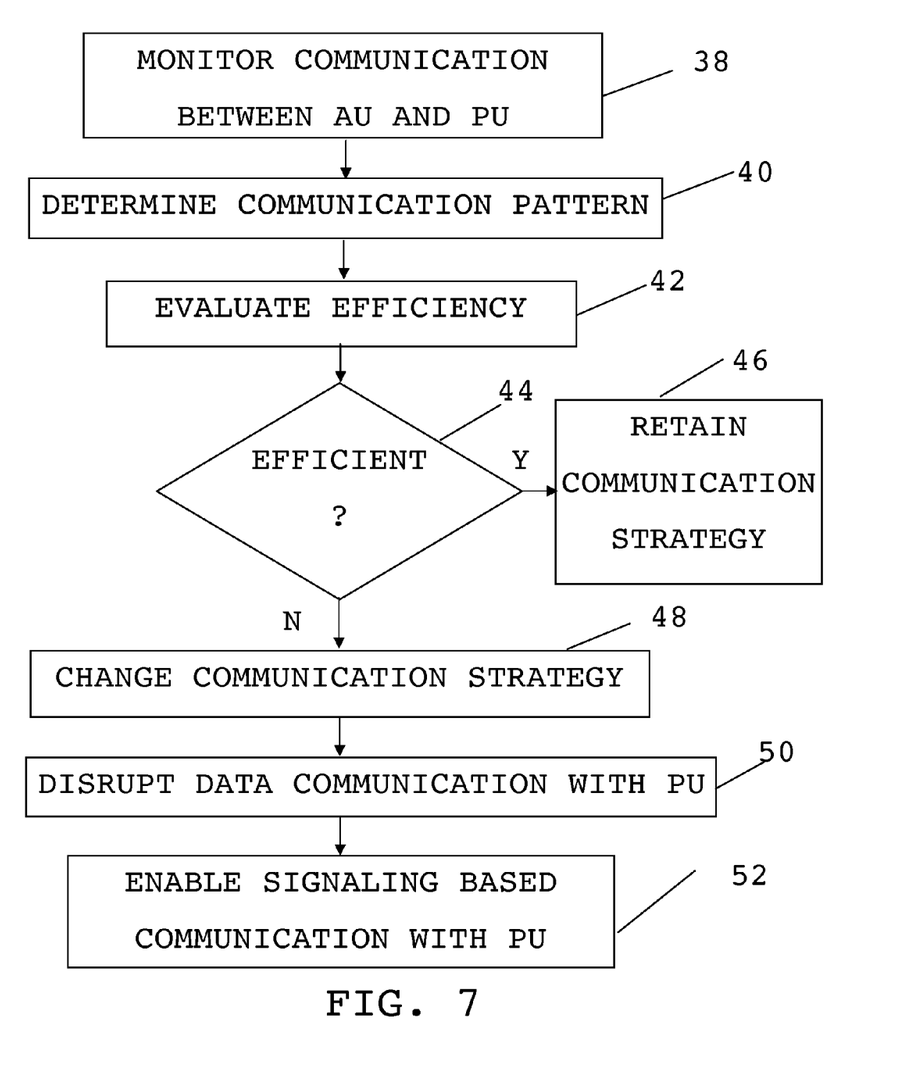
FIG. 7 shows a flow chart of a number of method steps in a general method for reducing the power consumption in the user terminal, FIG. 8 schematically shows a flow chart of a number of method steps in a general method for assisting in the reduction of the power consumption in the user terminal, FIG. 9 schematically shows a flow chart of a number of method steps being performed in a first variation of the general method for reducing the power consumption in the user terminal, FIG. 10 schematically shows a flow chart of a number of method steps being performed in a second variation of the general method for reducing the power consumption in the user terminal, and FIG. 11 schematically shows a computer program product according to an embodiment of the invention in the form of a CD ROM disc with a computer program performing the functionality of the invention.
Figure 8:
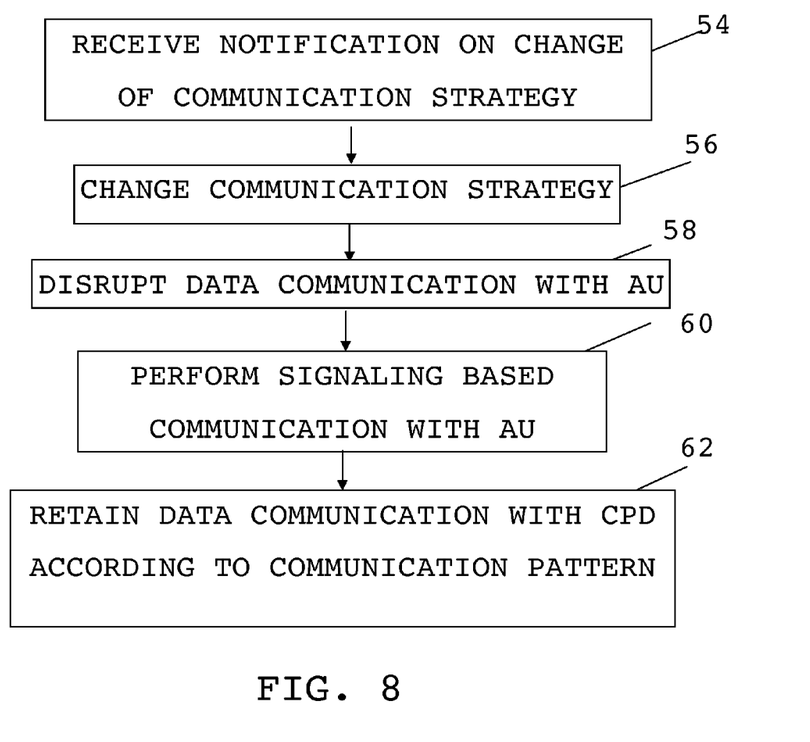

The functioning of the present invention according to one variation will now be described with reference being made to the previously mentioned FIG. 1-6 together with FIG. 7, which shows a flow chart of a number of method steps being performed in a general method for reducing the power consumption in the user terminal and to FIG. 8, which schematically shows a flow chart of a number of method steps being performed in a general method for assisting in the reduction. In this variation of the invention, the method for reducing the power consumption is performed in the first data communication emulating unit 18 in the user terminal 10 and the method for assisting in this reduction is performed in the second data communication emulating unit 32 in the proxy device 12.

The method for reducing the power consumption is started as a user of the user terminal 10 wants to use his application unit 16 for accessing content from the content providing device 14. The user thus starts an application being run by the application unit 16, which application may be a browser application. The accessing of content in such an application is normally done through using an URL associated with the content providing device 14. This URL can be obtained in a number of different ways, like being searched using a search engine, manually entered by the user or stored as a favourite in the application unit 16. When the user has provided the URL to or selected the URL in the application unit, the application unit 16 then sends a request REQ for content according to the data communication protocol, here http, for instance also using AJAX, Bayeux, Comet or Pushlet. This request REQ is sent via the first communication interface 22 to the proxy device 12, where it is received at the second communication interface 36 and from there forwarded to the proxy unit 30. The proxy unit treats the request through exchanging addresses and forwarding the request REQ' to the content providing device 14, which processes the request and sends a response RES', which response RES' is received by the proxy unit 30, and forwarded as response RES to the application unit 16 via the communication interfaces 22 and 36, also after changing addresses. In this way it is possible that several responses or requests are exchanged between application unit 16 and content providing device 14 via the proxy unit 30. It is also possible that the communication link on which these requests and responses are sent using the data communication protocol is kept open without any messages being exchanged. This is as such not new.

The communication pattern evaluating element 24 of the first data communication emulating unit 18 here monitors the communication between the application unit 16 and the proxy unit 30, step 38, which in this example is done through examining the data being exchanged via the first communication interface 22, i.e. through examining the socket provided by the application unit 16 in relation to this communication link.

Based on this monitored communication, the communication pattern evaluating element 24 then determines the pattern of the communication according to the data communication protocol on the link between the application unit 16 and proxy unit 30, step 40. It may involve determining how regularly requests and responses appear in the communication and/or investigating the similarities between requests and similarities between responses, i.e. how similar the requests sent are to each other and how similar responses are to each other. The communication pattern evaluating element 24 then evaluates the efficiency of the communication based on the communication pattern, step 42. If the communication pattern evaluating element 24 then determines that the communication is not efficient, step 44, then a change of communication strategy is decided, step 48, while if the communication pattern evaluating element 24 determines that the communication is efficient, step 44, then the communication strategy is retained, step 46. In this case a retaining of communication strategy includes allowing the application unit 16 to continue to communicate with the proxy unit 30 using the data communication protocol on the communication link dedicated to this session.

A change of communication strategy here involves a disruption of the data communication on the link between the application unit and proxy unit where the data communication protocol is used, step 50, and instead enabling a signalling based communication with the proxy unit, step 52. This means that the communication pattern evaluating element 24 orders the data communication emulating element 26 to disrupt the communication on the link between the application unit and proxy unit and thereby to intercept data provided by the application unit 16 on the first communication interface and forward some or all of said data to the signalling communication platform 20 in order to let this platform send said data to the signalling communication server 34 of the proxy device.

The data communication emulating element 26 here emulates an open socket connection according to the data communication protocol and routes the traffic from the application unit to the signalling communication platform 20 for being transferred based on signalling, such as based on IMS signalling. In order to perform this routing, the signalling communication platform 20 performs a registration to a registration entity in the first communication network 11, such as a SIP registration to an IMS core of the first communication network 11 and may then inform the second data communication emulating unit 32 in the proxy device 12 about the change of communication strategy. This informing may include an informing of the communication pattern.

The change of communication strategy may thus involve notifying the proxy device 12 of the change in strategy. However, it is also possible that the second data communication emulating unit 32 also determines such a change based on monitoring the communication on the second communication interface. If a notification is used, the second data communication emulating unit 32 receives the notifications, step 54, for instance via a signalling protocol based message, such as a SIP message, and then also the proxy device changes operation according to the new communication strategy, step 56. This change on the part of the proxy device 12 here involves the second data communication emulating unit 32 disrupting the communication between the proxy unit and application unit, step 58, and instead performing signalling based communication with the application unit via the signalling communication server 34, step 60. However at the same time the data communication according to the communication pattern using the data communication protocol is retained between the proxy unit 30 and the content providing device, step 62. This means that data being sent by the proxy unit to the application unit is intercepted and some or all of it sent to the application unit via the second data communication emulating unit. This also means that requests REQ' are being sent to the content providing device and responses RES* received from this device according to the communication pattern. Also here the second data communication emulating unit 32 emulates a connection between the proxy unit 30 and application unit 16 according to the data communication protocol using the signalling protocol. If the second data communication emulating unit is not aware of the communication pattern it may transfer all data intercepted by it. However, if it knows the communication pattern, through being notified or finding out itself, the second data communication emulating unit can limit the data sent on the emulated data connection.

According to the invention the communication pattern evaluating element detects the polling patterns/behaviours initiated from the application unit 16 according to the data communication protocol. The data communication emulating element then switches this type of polling to a registration in the first communication system for using the signalling based communication infrastructure to delegates the Publish/subscribe behaviours, i.e. using IMS as carrier through the first communication network instead of HTTP polling.

In this way the energy consuming communication on the link that uses the data communication protocol is disrupted and instead signalling based communication is used, which may involve sending messages according to the signalling protocol, such as SIP messages. In this way communication is only performed or a communication link is only open when it is necessary to actually send and receive data, which improves the efficiency considerably. The communication between the application unit and proxy unit is kept to a minimum. Through this measure network resources are also liberated. A dedicated connection is not kept, which also allows for a more flexible use of the first communication network than if a connection is kept for a whole communication session between the application unit and the proxy unit. At the same time the application unit and proxy unit are kept unaware of the change in communication. They believe that they communicate with each other according to the data communication protocol. This has the advantage of the application unit and proxy unit not needing to be modified. The invention can therefore be made to function in relation to any type of application in an application unit that uses the data communication protocol. However data actually transmitted is determined through an intelligent procedure in the first data communication emulating unit.

Figure 9:
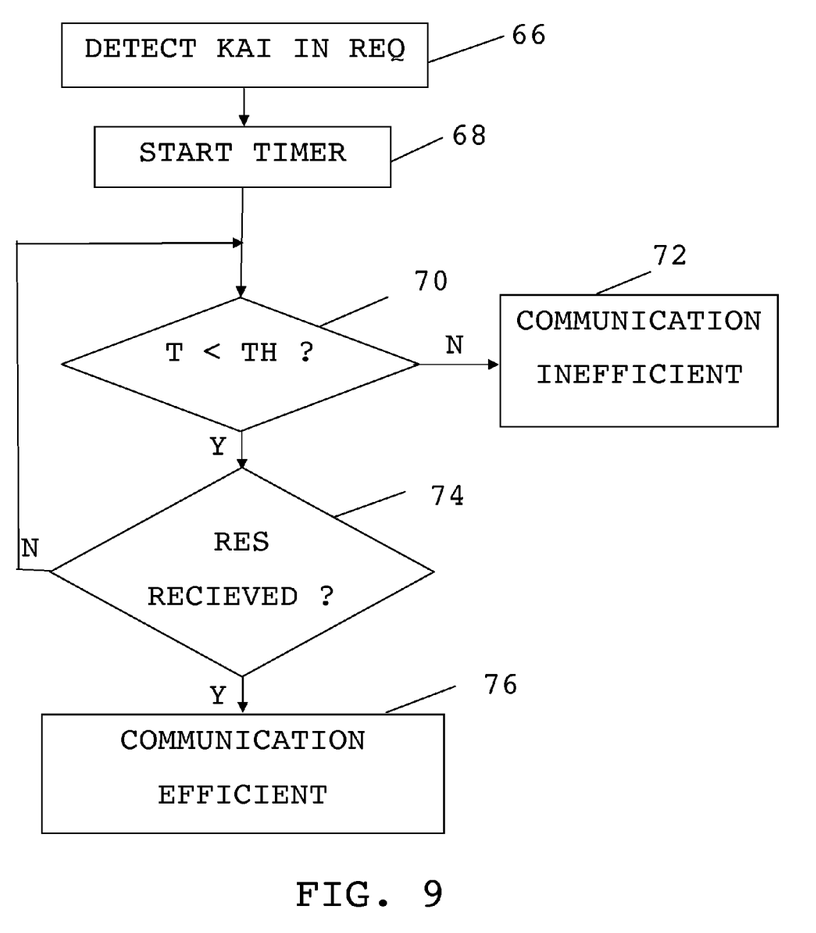

Now some more details on how the communication pattern evaluating element can determine that the communication is efficient or not can be made with reference being made also to FIG. 9, which shows a flow chart of a method steps outlining one variation in which efficiency can be determined. This variation is applicable when the application unit uses a so-called long polling scheme. According to this type of polling scheme, the application unit 16 sends a request REQ and then the communication link is kept open despite no data being transmitted for a long time by the proxy unit 30 or application unit 16. The link will be open until either the application unit or the proxy unit decides that the conversation is over, and one of them drops the connection. According to this variation of the invention dedicated to long polling schemes, the communication pattern evaluating element 24 monitors the communication via the first communication interface 22 and detects that there is such a link with a low usage level. This may here be done through the communication pattern evaluating unit detecting that there is a keep alive indicator KAI present in the keep alive field of the header HD of a request REQ being sent, step 66. Based on the detection of this indicator the communication pattern evaluating element 24 then starts a timer, step 68. The communication pattern evaluating element thereafter compares the value of the timer with a threshold TH, which threshold may have a suitable value, such as for instance 60 seconds. If then the value of the timer exceeds this threshold, step 70, then communication is deemed to be inefficient, step 72, and the data communication on the link between the application unit and proxy unit 30 using the data communication protocol is disrupted and signalling based communication enabled in the previously described manner. However, if the threshold is not exceeded then the communication pattern evaluating element 24 investigates if a response RES is received via the first communication interface 22. If such a response is received within the time limit then the communication is deemed efficient, step 76, and the timer stopped. The timer may then be started again if a new request is detected. If however no response is received, then the threshold is again investigated, step 70. In this way it is possible to determine if communication is efficient or not.

In this variation the connection according to the data communication protocol will be switched over to a signalling based connection, here an IMS based connection. This means that the data communication emulating units will emulate the data communication of the data communication protocol on the Socket level so that the application unit still believes that the communication link is open. The communication pattern evaluating element will then hand-over the open connection for the communication according to the data communication protocol to the first data communication emulating unit for setup of an signalling protocol based connection, here an IMS connection, to the second data communication emulating unit. In the example of IMS and http, the first data communication emulating unit will then perform a SIP registration to the IMS network and to the second data communication emulating unit using the signalling communication platform. The second data communication emulating unit may perform a handover via SIP of the HTTP connection from the data communication link to a signalling based link using the signalling communication server 34, while keeping the connection to the content providing device. Thereafter the second data communication emulating unit drops the "direct" connection between proxy unit and application unit. When the content providing device is responding with content, then the second data communication emulating unit 32 may send a SIP message for setting up an IMS transport connection, for instance via Resource ReSerVation Protocol (RSVP), back to the user terminal holding the content. Small sized responses may then be sent using SIP messages. Now all responses and requests including new data will be transparently transported via IMS, through a virtual IMS path between user terminal and proxy device until there are no more long polling requests.

It should be realized that it is not necessary to look for the keep-alive indicator in the above described method steps. The timer may as an alternative be started as soon as a request is detected.

It is also possible that a short polling scheme is used by the application unit, proxy unit and content providing device. In this case another way of investigating the communication pattern is needed. In this short polling scheme there are several requests and responses being sent and often with the same data at least in the payload.

Figure 10:
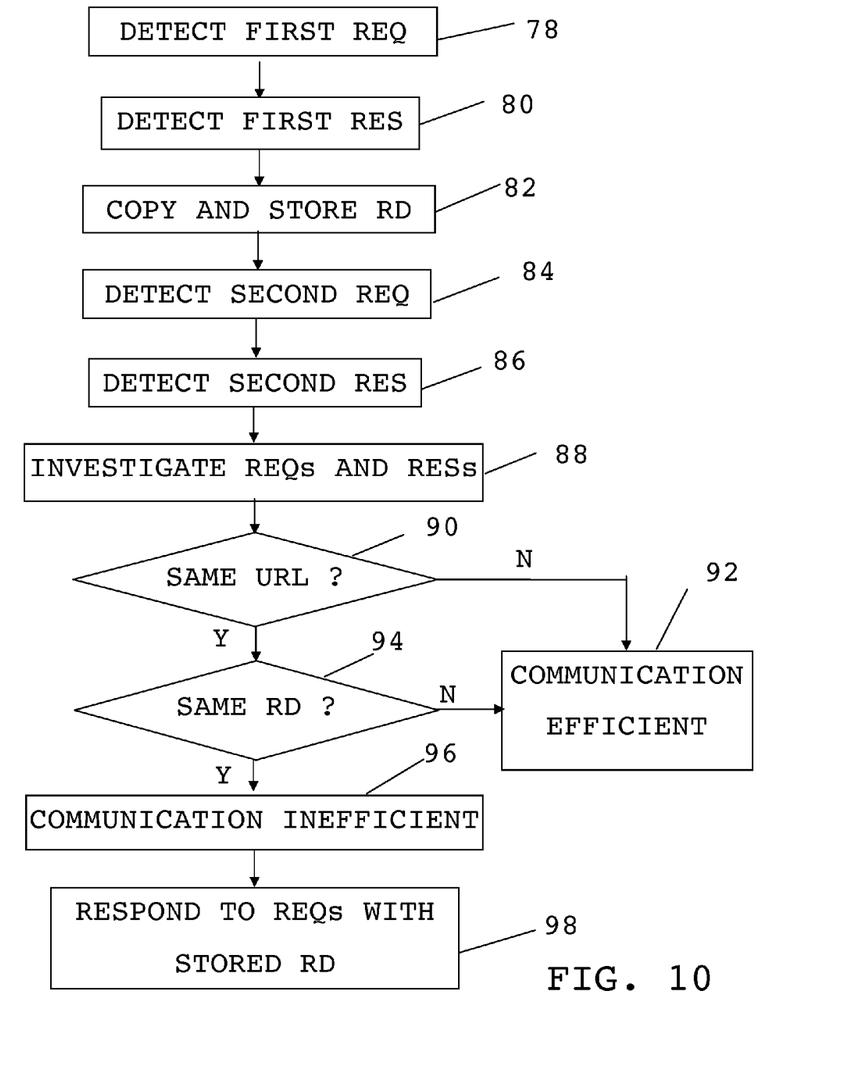

The monitoring of the communication in this case involves the communication pattern evaluating element 24 detecting a first request, step 78, and also detecting a first response to the request, step 80. The communication pattern evaluating element 24 may then locally store a copy of a destination identifier appearing in the payload of the request, which destination identifier may be the URL of the content providing device. This identifier may be stored in the communication data memory 28. The communication pattern evaluating element 24 also copies the response data RD in the payload of the first response into the communication data memory 28, step 82. Thereafter a second request is detected, step 84, followed by the detection of a second response, step 86. The destination identifier used in this second request is then compared with the stored destination identifier, step 88, and if they differ, step 90, then communication is deemed efficient, step 92. However if they are the same, step 90, then the response data of the second response is compared with the response data RD in the communication data memory 28. If the response data differs, step 94, then communication is again deemed efficient, step 92. However, if it is the same response data, step 94, then communication is deemed to be inefficient, step 96. In this case a change of communication strategy is again performed. The communication pattern evaluating element 26 now orders the data communication emulating element 26 to emulate the data communication on the connection implemented through the two communication interfaces.

This is done through the data communication emulating element monitoring requests on the first communication interface. If it detects a request to the same content providing device, then that request is not being sent at all. Instead the data communication emulating element fetches the response data RD from the communication data memory and responds to the application using this stored response data, step 98.

A request that differs will however be sent. This different request will then be sent by the data communication emulating element 26 to the signalling communication platform 20, from where it is transferred to the signalling communication server 34 for being routed to the second communication interface 36 by the second data communication emulating unit 32.

The data communication emulating element thus responds to the request with the stored response data and also makes it look like this response has been sent by the proxy unit of the proxy device. This is thus done without any request or response being exchanged between user terminal and proxy device. At the same time the second data communication emulating unit 32 may generate requests on its own, which requests look like the requests of the detected communication pattern. These requests are then forwarded to the proxy unit and may look like they are being sent from the application unit. Requests corresponding to this request generated by the second data communication emulating unit 32 will then be sent to the content providing device 16 from the proxy unit 30 in a known way. The proxy unit 30 will also receive responses from the content providing device 16, which responses are then provided on the second communication interface 36 for being sent to the application unit in the user terminal. However these responses are not sent, but picked up by the second data communication emulating unit 32. If the response data of a response is the same as that used previously, i.e. if a response received from the content providing device includes the same response data in its payload as the response data that is stored in the communication data memory of the first data communication emulating unit, then no response is being sent from the proxy device to the user terminal. However, if the payload is different, the response is provided by the second data communication emulating unit to the signalling communication server 20, which sends it in a SIP message or in a SIP initiated file transfer to the user terminal, from where the first data communication emulating element fetches it and then provides it to the first communication interface of the application unit. Here it can also be mentioned that if the second data communication emulating unit is notified of the change in communication strategy, this notification can include the above-mentioned response data or an indication of this response data as well as the destination identifier, such as the URL, of the content providing device.

In relation to a data communication protocol that is http and a signalling based protocol that is SIP using in relation to IMS, it can thus be seen that the communication pattern evaluating element will order the data communication emulating element to take over all new short HTTP polling request and emulate the repeating response data patterns. At the same time the data communication emulating element will also perform a SIP registration to the IMS network and order the second data communication emulating unit to perform the short polling instead with expected HTTP responses. If the second data communication emulating unit notices that the response has been changed then it can open an IMS transport connection via RSVP for returning large HTTP content back to the user terminal and otherwise send content back in SIP messages if the HTTP content is small.

In this way communication between the application unit and proxy unit is kept to a minimum, and thus energy is saved, while at the same time both application unit and proxy unit believe they communicate according to the data communication protocol take place. In the variations described above the proxy unit acted normally, i.e. as if the direct connection between application unit and proxy unit existed. It should be realized that the proxy unit may as an alternative include the functionality of the second data communication emulating unit. The proxy unit may thus be a more "intelligent" proxy unit, which retains a connection with a content providing device while changing to signalling based communication with the user terminal.

It should here furthermore be realized that the investigation of communication pattern need not be performed in the user terminal. It may just as well be performed in the proxy device. The communication pattern evaluating element can thus be provided in a communication device, which may be either a proxy device or a user terminal. This also means that a data communication emulating unit, in the user terminal or the proxy device, normally includes a data communication emulating element and depending on if the communication pattern is to be investigated or not a communication pattern evaluating element and optionally also a communication data memory.

The application unit, the signalling communication platform and the communication pattern evaluating element and the data communication emulating element of the first data communication emulating unit may with advantage be provided in the form of a processor with associated program memory including computer program code for performing the functionality of these units. The proxy unit, second data communication emulating unit and signalling communication server may also be provided in the same way. However this computer program code can be provided as a computer program, for instance on a server, and then downloaded to a user terminal or proxy device.

Figure 11:
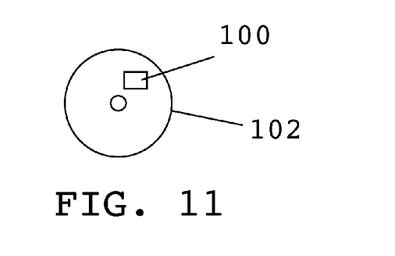

This computer program may also be provided on a computer readable means, for instance in the form of a data carrier, like a CD ROM disc or a memory stick carrying such a computer program with the computer program code, which will implement the function of the above-described unit or units when being loaded into a user terminal or proxy server. One such computer program product in the form of a CD ROM disc 102 with the above-mentioned computer program 100 is schematically shown in FIG. 11.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims.

The invention claimed is:

1. A method for reducing the power consumption of a user terminal in a communication network, said method being performed in a data communication emulating unit located in the user terminal or in a proxy device of the communication network and comprising the steps of:
monitoring communication between an application unit in the user terminal and a proxy unit in the proxy device, said communication employing requests and responses based on a data communication protocol,
determining a communication pattern of the monitored communication,
evaluating if the communication is efficient or not based on the communication pattern, and
changing communication strategy if the communication pattern is found to be inefficient through performing the further steps of
disrupting communication between the application unit and the proxy unit using the data communication protocol and enabling communication between the proxy unit and application unit based on a signalling protocol.

2. The method according to claim 1, wherein said data communication emulating unit is provided at one end of a communication link between the user terminal and the proxy device and the step of changing communication strategy further comprises notifying the change to the corresponding data communication emulating unit at the opposite end of the communication link.

3. The method according to claim 2, wherein the providing includes notifying the communication pattern.

4. The method according to claim 1, wherein the step of monitoring comprises detecting at least one request (REQ) for data sent by the application unit, said request being intended for a content providing device via the proxy unit of the proxy device, the step of determining the communication pattern comprises determining the length of time between a first request and a response (RES) on the communication link, and the step of evaluating if the communication is efficient or not comprises comparing said length of time (T) with a threshold (TH), where the communication is found to be inefficient if the threshold is exceeded.

5. The method according to claim 4, wherein the step of detecting at least one request comprises detecting an indication (KAI) in said request (REQ) that the communication link between the application unit and the proxy unit is to be kept open for several requests and responses.

6. The method according to claim 1, wherein the step of monitoring comprises detecting requests (REQ) for data sent by the application unit as well as detecting responses to these requests sent by said proxy unit to the application unit, said requests being intended for content providing devices and the responses originating from content providing devices via the proxy unit of the proxy device, and the step of determining the communication pattern comprises investigating the requests and responses and the communication is found to be inefficient if the same response is received to requests intended for the same content providing device.

7. The method according to claim 6, wherein said data communication emulating unit is a first data communication emulating unit in the user terminal and further comprising the step of copying the responses received by the application unit and when, after a change of communication strategy has been made, a new request destined to the content providing device is being sent by the application unit, responding to the request with a copy of a previous response while stopping the request from being sent to the proxy device.

8. The method according to claim 6, wherein said data communication emulating unit is a second data communication emulating unit in the proxy device and further comprising the step of copying the request sent by the application unit and sending, after a change of communication strategy has been made, request copies to the content providing device according to the communication pattern while stopping responses from reaching the user terminal.

9. A communication device for reducing the power consumption of a user terminal in a communication network, comprising:
a data processing unit communicating with another data processing unit employing requests and responses based on a data communication protocol, where one of the data processing units is an application unit in the user terminal and the other is a proxy unit in a proxy device of the communication network,
a signalling communication unit for communicating with entities in the network using a signalling protocol, and
a data communication emulating unit configured to:
monitor said communication between the application unit and the proxy unit,
determine a communication pattern of the monitored communication,
evaluate if the communication is efficient or not based on the communication pattern, and change communication strategy if the communication pattern is found to be inefficient through further configuring the data communication emulating unit to:
disrupt communication between the application unit and the proxy unit using the data communication protocol and enable communication between the proxy unit and application unit based on the signalling protocol.

10. A non-transitory computer program product, comprising a computer readable medium, for reducing power consumption of a user terminal in a communication network comprising computer program code which when run on a data communication emulating unit located in the user terminal or in a proxy device of the communication network causes said data communication emulating unit to: monitor communication between an application unit in the user terminal and a proxy unit in the proxy device, said communication employing requests and responses based on a data communication protocol, determine a communication pattern of the monitored communication, evaluate if the communication is efficient or not based on the communication pattern, and change communication strategy if the communication pattern is found to be inefficient through further performing disrupting of communication between the application unit and the proxy unit using the data communication protocol and enabling communication between the proxy unit and application unit based on a signalling protocol.

11. A non-transitory computer program product comprising a computer program according to claim 10 and a computer readable medium on which the computer program is stored.

12. A method for assisting in the reduction of the power consumption of a user terminal in a communication network, said method being performed in a data communication emulating unit located in the user terminal or in a proxy device of the network, the method comprising the steps of:
receiving a notification of a change of communication strategy from a corresponding data communication emulating unit of a corresponding communication device, said communication strategy concerning communication between an application unit in the user terminal and a proxy unit in the proxy device, said communication employing requests and responses based on a data communication protocol, and
changing communication strategy based on the received notification through disrupting data communication between the proxy unit and the application unit using the data communication protocol, and
enabling communication between the application unit and proxy unit based on a signalling protocol.

13. A method according to claim 12, wherein the corresponding data communication emulating unit is a first data communication emulating unit in the user terminal and said data communication emulating unit is a second data communication emulating unit in the proxy device also communicating with a content providing device using requests and responses based on a data communication protocol and further comprising the step of retaining said communication with the content providing device.

14. A method according to claim 13, further comprising the steps of sending, after a change of communication strategy has been made, copies (REQ') of requests (REQ) to the content providing device according to the communication pattern while stopping responses from reaching the user terminal.

15. A communication device for assisting in the reduction of the power consumption of a user terminal in a communication network and comprising:
a data processing unit communicating with a further data processing unit of a further communication device employing requests and responses based on a data communication protocol, where one of the data processing units is an application unit in the user terminal and the other is a proxy unit in a proxy device of the communication network,
a signalling communication unit for communicating with entities in the network using a signalling protocol, and
a data communication emulating unit configured to:
receive a notification of a change of communication strategy from a corresponding data communication emulating unit of the further communication device, said communication strategy concerning the communication between the application unit and the proxy unit, and
change communication strategy based on the received notification through disrupting data communication between the proxy unit and the application unit using the data communication protocol, and
enabling communication between the application unit and proxy unit based on the signalling protocol.

16. A non-transitory computer program product, comprising a computer readable medium, for assisting in the reduction of the power consumption of a user terminal in a communication network, said computer program comprising computer program code, which when run on a data communication emulating unit located in a user terminal or in a proxy device of the communication network causes said data communication emulating unit to
receive a notification of a change of communication strategy from a corresponding data communication emulating unit of a corresponding communication device, said communication strategy concerning communication between an application unit in the user terminal and a proxy unit in the proxy device, said communication employing requests and responses based on a data communication protocol, and
change communication strategy based on the received notification through disrupting data communication between the proxy unit and the application unit using the data communication protocol, and
enabling communication between the application unit and proxy unit based on a signalling protocol.

17. A non-transitory computer program product comprising a computer program according to claim 16 and a computer readable medium on which the computer program is stored.

* * * * *